US 11,808,247 B2

(12) United States Patent
Hoelzl

(10) Patent No.: US 11,808,247 B2
(45) Date of Patent: Nov. 7, 2023

(54) PLANETARY GEAR SET FOR A WIND TURBINE

(71) Applicant: Miba Gleitlager Austria GmbH, Laakirchen (AT)

(72) Inventor: Johannes Sebastian Hoelzl, Berg im Attergau (AT)

(73) Assignee: MIBA GLEITLAGER AUSTRIA GMBH, Laakirchen (AT)

( * ) Notice: Subject to any disclaimer, the term of this patent is extended or adjusted under 35 U.S.C. 154(b) by 348 days.

(21) Appl. No.: 17/293,960

(22) PCT Filed: Dec. 6, 2019

(86) PCT No.: PCT/AT2019/060420
§ 371 (c)(1),
(2) Date: May 14, 2021

(87) PCT Pub. No.: WO2020/118328
PCT Pub. Date: Jun. 18, 2020

(65) Prior Publication Data
US 2022/0010782 A1    Jan. 13, 2022

(30) Foreign Application Priority Data

Dec. 13, 2018  (AT) .............................. A 51110/2018

(51) Int. Cl.
F03D 5/00      (2006.01)
F03D 9/25      (2016.01)
(Continued)

(52) U.S. Cl.
CPC ............... *F03D 15/00* (2016.05); *F03D 9/25* (2016.05); *F03D 80/70* (2016.05); *F03D 80/82* (2016.05);
(Continued)

(58) Field of Classification Search
CPC . F03D 15/00; F03D 9/25; F03D 80/70; F03D 80/82; F16H 57/0424;
(Continued)

(56) References Cited

U.S. PATENT DOCUMENTS 3,203,260 A    8/1965  Pierry et al.
6,637,942 B2   10/2003 Dourlens et al.
(Continued)

FOREIGN PATENT DOCUMENTS

AT    509 625 B1    10/2011
AT    516029 A4     2/2016
(Continued)

OTHER PUBLICATIONS

International Search Report in PCT/AT2019/060420, dated Mar. 5, 2020.
(Continued)

*Primary Examiner* — Audrey B. Walter
(74) *Attorney, Agent, or Firm* — Collard & Roe, P.C.

(57) ABSTRACT

A planetary gearbox for a wind turbine has a planetary gearbox housing, at least one sun gear, at least one internal gear, a planetary carrier with a first planet carrier cheek and a second planet carrier cheek, at least one planetary gear bolt, which is accommodated in the planetary carrier, at least one planetary gear, which is mounted on the planetary gear bolt, and at least one planetary gear radial sliding bearing which comprises a sliding surface. An oil distribution channel section is formed at least in the first planet carrier cheek. The first planet carrier cheek is mounted in the planetary gearbox housing by a radial sliding bearing. The radial sliding bearing is simultaneously formed as a flow connection element for flow connection of the oil distribution (Continued)

Figure 1:
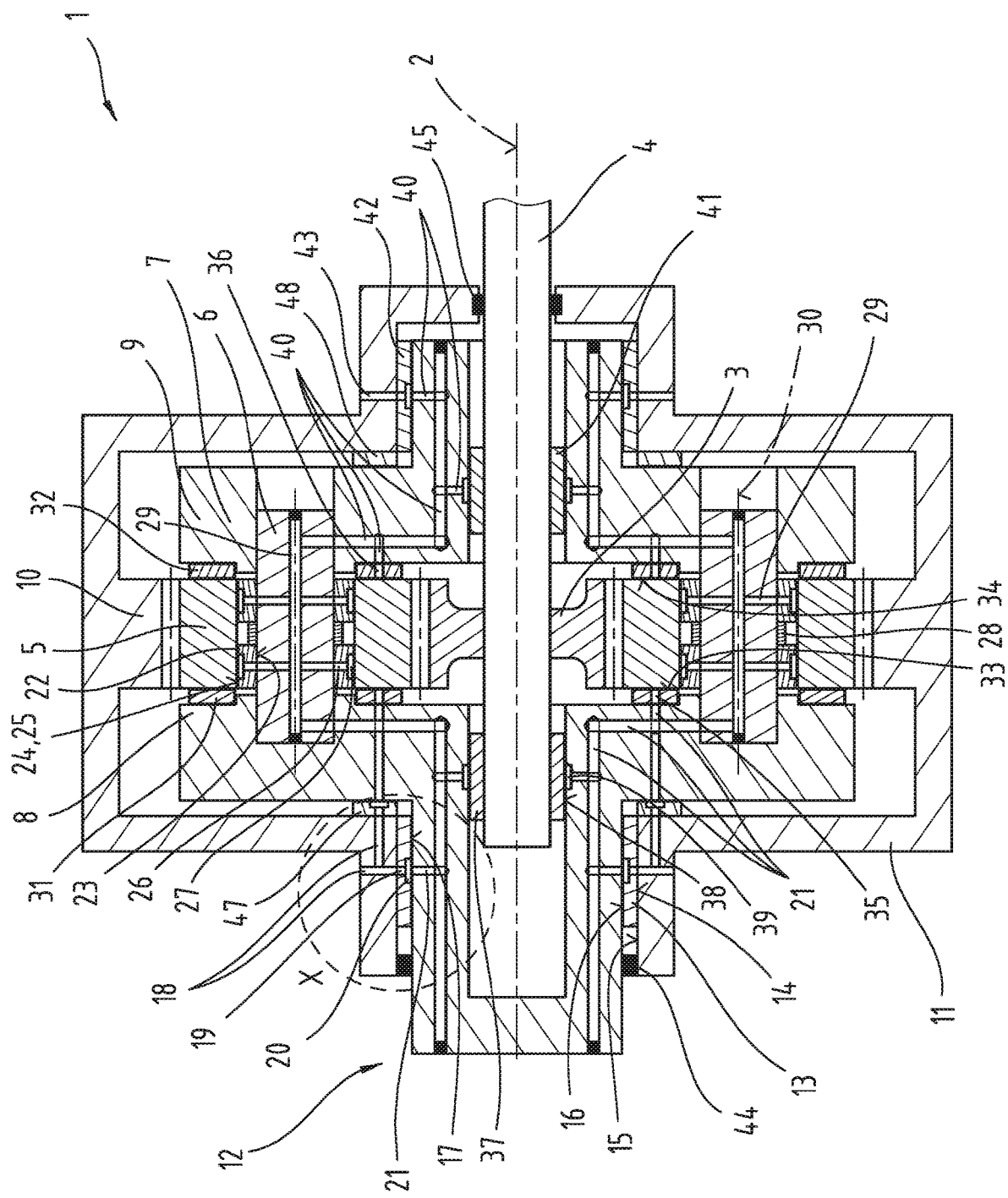

channel section of the first planet carrier cheek to a first lubricating oil supply bore arranged in the planetary gearbox housing.

11 Claims, 3 Drawing Sheets

(51) Int. Cl.
| | |
|---|---|
| *F16H 57/04* | (2010.01) |
| *F16H 57/08* | (2006.01) |
| *F03D 80/70* | (2016.01) |
| *F03D 15/00* | (2016.01) |
| *F03D 80/80* | (2016.01) |
| *F16H 57/02* | (2012.01) |

(52) U.S. Cl.
CPC ....... *F16H 57/043* (2013.01); *F16H 57/0424* (2013.01); *F16H 57/0471* (2013.01); *F16H 57/0479* (2013.01); *F16H 57/0486* (2013.01); *F16H 57/082* (2013.01); *F05B 2220/706* (2013.01); *F05B 2240/21* (2013.01); *F05B 2260/40311* (2013.01); *F16H 2057/02078* (2013.01); *F16H 2057/085* (2013.01)

(58) Field of Classification Search
CPC ............... F16H 57/043; F16H 57/0471; F16H 57/0479; F16H 57/0486; F16H 57/082; F16H 2057/02078; F16H 2057/085; F05B 2220/706; F05B 2240/21; F05B 2260/40311

See application file for complete search history.

(56) References Cited

U.S. PATENT DOCUMENTS

| | | |
|---|---|---|
| 6,866,423 B2 | 3/2005 | Faltus et al. |
| 7,255,537 B2 | 8/2007 | Flamang et al. |
| 7,794,151 B2 | 9/2010 | Neumann |
| 7,832,980 B2 | 11/2010 | Demtroder et al. |
| 8,545,186 B2 | 10/2013 | Loeschner et al. |
| 8,591,371 B2 | 11/2013 | Dinter et al. |
| 8,840,521 B2 | 9/2014 | Kari et al. |
| 8,974,120 B2 | 3/2015 | Pedersen et al. |
| 9,057,365 B2 | 6/2015 | Han et al. |
| 9,206,787 B2 | 12/2015 | Winkelmann |
| 9,279,413 B2 | 3/2016 | Ebbesen et al. |
| 9,297,454 B2 | 3/2016 | Barthel et al. |
| 9,435,376 B2 | 9/2016 | Gaertner et al. |
| 9,458,880 B2 | 10/2016 | Kari et al. |
| 9,657,716 B2 | 5/2017 | Vervoorn et al. |
| 9,677,606 B2 | 6/2017 | Pischel |
| 9,683,602 B2 | 6/2017 | Hager et al. |
| 9,784,245 B2 | 10/2017 | Hager et al. |
| 9,845,826 B2 | 12/2017 | Sutton et al. |
| 9,869,349 B2 | 1/2018 | Rittmann et al. |
| 9,995,283 B2 | 6/2018 | Stiesdal |
| 10,072,704 B2 | 9/2018 | Sato et al. |
| 10,288,164 B2 | 5/2019 | Hoelzl |
| 10,436,249 B2 | 10/2019 | Hoelzl |
| 10,451,176 B2 | 10/2019 | Hoelzl |
| 10,502,259 B2 | 12/2019 | Meyer |
| 10,598,214 B2 | 3/2020 | Hoelzl |
| 10,612,586 B2 | 4/2020 | Frydendal et al. |
| 10,724,624 B2 | 7/2020 | Tulokas |
| 11,009,077 B2 | 5/2021 | Hofmann et al. |
| 11,280,320 B2 | 3/2022 | Claramunt Estecha et al. |
| 11,384,728 B2 | 7/2022 | Elmose |
| 2002/0114549 A1 | 8/2002 | Hokkirigawa et al. |
| 2003/0063821 A1 | 4/2003 | Dourlens et al. |
| 2005/0129341 A1 | 6/2005 | Hoppe |
| 2010/0111459 A1 | 5/2010 | Yasuda |
| 2011/0254281 A1 | 10/2011 | Noda et al. |
| 2013/0071246 A1 | 3/2013 | Kari et al. |
| 2013/0172144 A1 | 7/2013 | Suzuki et al. |
| 2014/0161614 A1 | 6/2014 | Vervoorn et al. |
| 2014/0169952 A1 | 6/2014 | Pedersen et al. |
| 2014/0193262 A1 | 7/2014 | Pedersen et al. |
| 2014/0193264 A1 | 7/2014 | Pedersen et al. |
| 2014/0377063 A1 | 12/2014 | Guerenbourg et al. |
| 2015/0017000 A1 | 1/2015 | Sato et al. |
| 2015/0055899 A1 | 2/2015 | Kodama et al. |
| 2015/0159693 A1 | 6/2015 | Corts |
| 2015/0204383 A1 | 7/2015 | Ishii et al. |
| 2015/0330498 A1* | 11/2015 | Carlino ................... F16H 57/04 475/159 |
| 2015/0369284 A1 | 12/2015 | Hager et al. |
| 2016/0076522 A1 | 3/2016 | Rohden |
| 2016/0327148 A1* | 11/2016 | Dinter ................. F16H 57/0479 |
| 2018/0187719 A1* | 7/2018 | Tulokas .............. F16H 57/0479 |
| 2020/0158090 A1 | 5/2020 | Hager et al. |
| 2020/0173425 A1 | 6/2020 | Schroeder |

FOREIGN PATENT DOCUMENTS

| | | |
|---|---|---|
| AT | 519288 A1 | 5/2018 |
| AT | 15975 U1 | 10/2018 |
| AU | 650057 B2 | 3/1992 |
| AU | 2008331343 A1 | 2/2010 |
| CN | 101438068 A | 5/2009 |
| CN | 101965455 A | 2/2011 |
| CN | 102009663 A | 4/2011 |
| CN | 202082374 U | 12/2011 |
| CN | 102345676 A | 2/2012 |
| CN | 102418833 A | 4/2012 |
| CN | 102713276 A | 10/2012 |
| CN | 202811230 U | 3/2013 |
| CN | 103557124 A | 2/2014 |
| CN | 103765005 A | 4/2014 |
| CN | 104234949 A | 12/2014 |
| CN | 104819209 A | 8/2015 |
| CN | 104956101 A | 9/2015 |
| CN | 204627877 U | 9/2015 |
| CN | 106062391 A | 10/2016 |
| CN | 106164509 A | 11/2016 |
| CN | 106884972 A | 6/2017 |
| CN | 108026975 A1 | 5/2018 |
| CN | 108167442 A1 | 6/2018 |
| CN | 108884863 A | 11/2018 |
| DE | 37 02 008 A1 | 8/1988 |
| DE | 3726751 A1 | 2/1989 |
| DE | 10064261 A1 | 7/2002 |
| DE | 10 2005 001 344 A1 | 7/2006 |
| DE | 10 2005 018 836 B3 | 12/2006 |
| DE | 60219261 T2 | 1/2008 |
| DE | 10 2011 010 204 A1 | 8/2012 |
| DE | 10 2011 119 471 A1 | 5/2013 |
| DE | 10 2012 212 792 A1 | 1/2014 |
| DE | 10 2013 211 710 B3 | 10/2014 |
| DE | 10 2014 205 637 A1 | 10/2015 |
| DE | 10 2015 201 356 A1 | 7/2016 |
| DE | 11 2013 003 034 B4 | 8/2017 |
| DK | 201670106 A1 | 9/2017 |
| EP | 1 564 406 A1 | 8/2005 |
| EP | 2 003 334 A1 | 12/2008 |
| EP | 2 136 093 A1 | 12/2009 |
| EP | 2290269 A1 | 3/2011 |
| EP | 2 383 480 B1 | 10/2012 |
| EP | 2 568 163 A1 | 3/2013 |
| EP | 2 597 307 A2 | 5/2013 |
| EP | 2 600 037 A1 | 6/2013 |
| EP | 2 657 519 A1 | 10/2013 |
| EP | 2 679 492 A1 | 1/2014 |
| EP | 2 711 568 A1 | 3/2014 |
| EP | 2816226 A1 | 12/2014 |
| EP | 2 863 076 A1 | 4/2015 |
| EP | 2 955 413 A1 | 12/2015 |
| EP | 3 012 479 A1 | 4/2016 |
| EP | 3 040 553 A1 | 7/2016 |
| EP | 3091242 A1 | 11/2016 |
| EP | 3 139 034 A1 | 3/2017 |
| EP | 3 173 642 A1 | 5/2017 |

(56) References Cited

FOREIGN PATENT DOCUMENTS

| | | |
|---|---|---|
| EP | 3 252 306 A1 | 6/2017 |
| EP | 3 279 471 A1 | 2/2018 |
| EP | 3 343 071 A1 | 7/2018 |
| EP | 3 396 187 A1 | 10/2018 |
| GB | 1405118 A | 9/1975 |
| GB | 2 201 200 B | 8/1990 |
| JP | S59-54812 A | 3/1984 |
| JP | H04-203566 A | 7/1992 |
| JP | H07-3248 B2 | 1/1995 |
| JP | H07-293556 A | 11/1995 |
| JP | H11-303857 A | 11/1999 |
| JP | 2002-195261 A1 | 7/2002 |
| JP | 2003176822 A | 6/2003 |
| JP | 2003194071 A | 7/2003 |
| JP | 2006118552 A | 5/2006 |
| JP | 2010-101263 A | 5/2010 |
| JP | 2010151207 A | 7/2010 |
| JP | 2014-159861 A | 9/2014 |
| JP | 2015-001279 A | 1/2015 |
| JP | 2017-048849 A | 3/2017 |
| KR | 2014-0143620 A | 12/2014 |
| WO | 2007/071239 A1 | 6/2007 |
| WO | 2008/152083 A1 | 12/2008 |
| WO | 2011/127509 A1 | 10/2011 |
| WO | 2011/127510 A1 | 10/2011 |
| WO | 2012/103913 A1 | 8/2012 |
| WO | 2013/191163 A1 | 12/2013 |
| WO | 2014/005587 A1 | 1/2014 |
| WO | 2014/117196 A1 | 8/2014 |
| WO | 2014/173808 A1 | 10/2014 |
| WO | 2017/144058 A1 | 8/2017 |
| WO | 2018/071941 A1 | 4/2018 |

OTHER PUBLICATIONS

International Search Report in PCT/AT2019/060424, dated Apr. 3, 2020.
International Search Report in PCT/AT2019/060425, dated Apr. 14, 2020.
International Search Report in PCT/AT2019/060421, dated Apr. 3, 2020.
International Search Report in PCT/AT2019/060426, dated Apr. 7, 2020.
International Search Report in PCT/AT2019/060419, dated Mar. 26, 2020.
Li Yunlong, Discussion on Localization of Composite Material Sliding Bearing in Hydropower Projects, Hongshui River, vol. 35, Issue 2, 4 pages, with English Abstract at the end of the document, Apr. 2016.

* cited by examiner

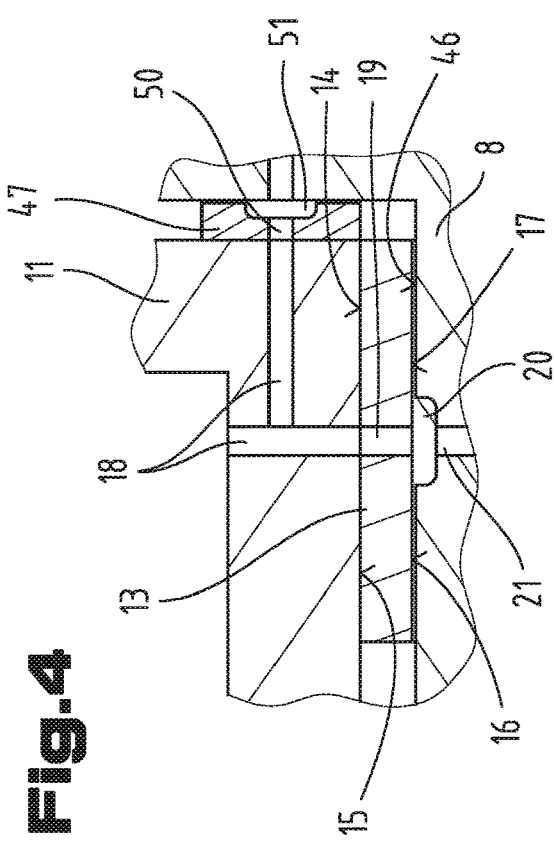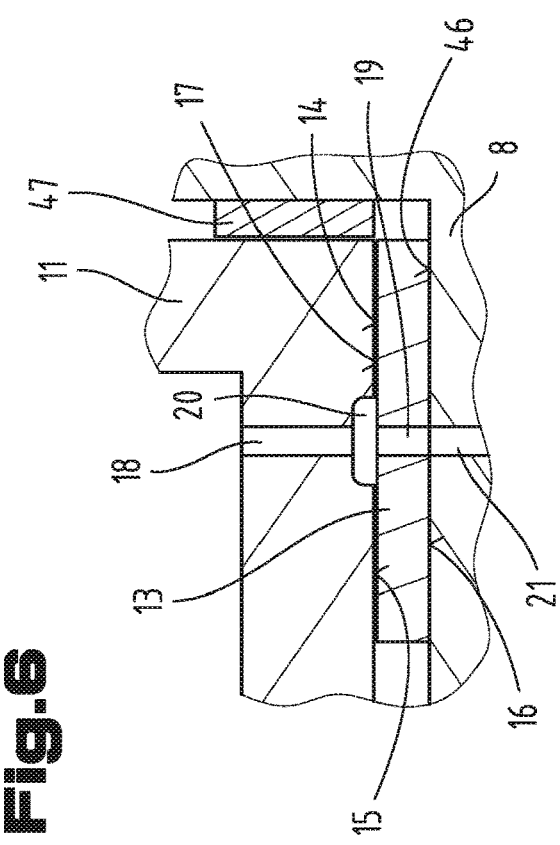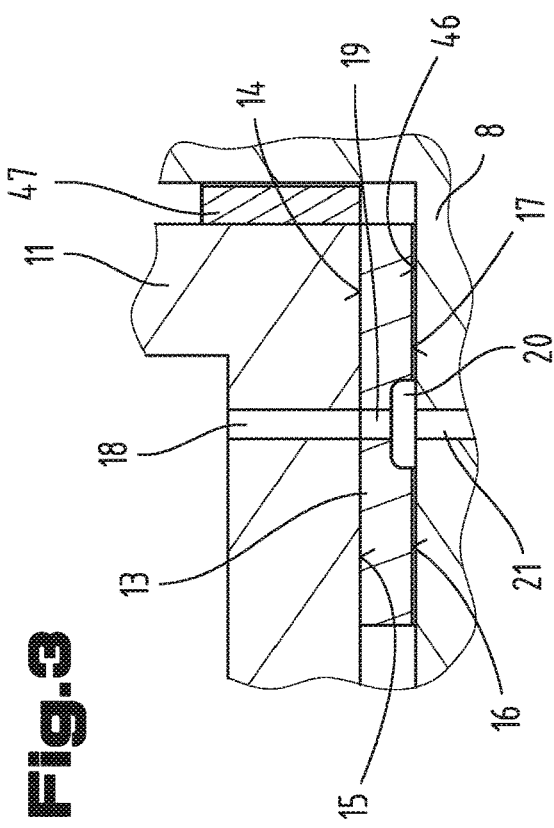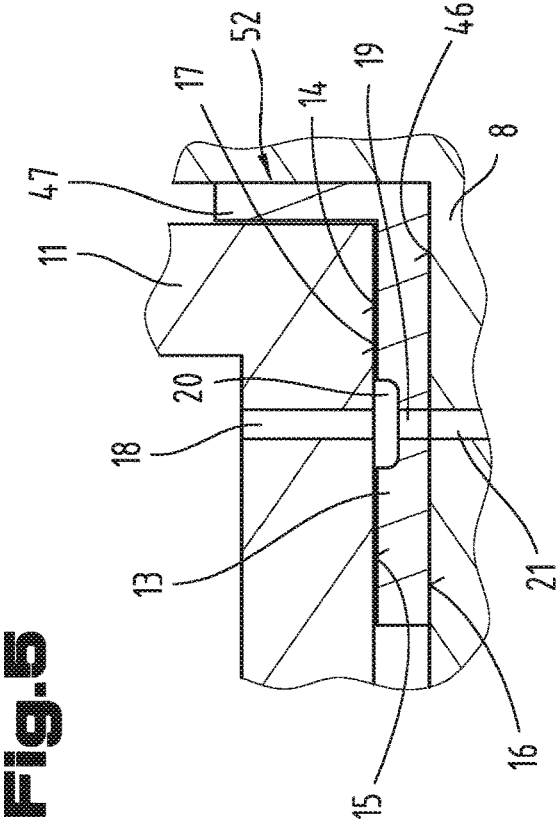

PLANETARY GEAR SET FOR A WIND TURBINE

CROSS REFERENCE TO RELATED APPLICATIONS

This application is the National Stage of PCT/AT2019/060420 filed on Dec. 6, 2019, which claims priority under 35 U.S.C. § 119 of Austrian Application No. A51110/2018 filed on Dec. 13, 2018, the disclosure of which is incorporated by reference. The international application under PCT article 21(2) was not published in English.

The invention relates to a planetary gearbox as well as to a wind turbine equipped with the planetary gearbox.

A generic planetary gearbox is known, for example, from WO 2011127509 A1 of the same applicant.

A further generic planetary gearbox is known from EP 2 383 480 B1. The planetary gearbox known from EP 2 383 480 B1 has the disadvantage that it has a complex structure in particular in the region of the oil feed to the planetary pin.

It was the object of the present invention to overcome the disadvantages of the prior art and to provide a planetary gearbox for a wind turbine with a simplified structure.

This object is achieved by means of a device and a method according to the claims.

According to the invention, a planetary gearbox for a wind turbine is formed. The planetary gearbox comprises:
- a planetary gearbox housing;
- at least one sun gear;
- at least one internal gear;
- a planetary carrier having a first planet carrier cheek and a second planet carrier cheek;
- at least one planetary gear bolt, which is accommodated in the planetary carrier;
- at least one planetary gear, which is mounted on the planetary gear bolt;
- at least one planetary gear radial sliding bearing, which serves for bearing the planetary gear on the planetary gear bolt and comprises a sliding surface, wherein an oil distribution channel section, which is fluidically connected to at least one section of the sliding surface, is formed at least in the first planet carrier cheek. The first planet carrier cheek of the planetary carrier is mounted in the planetary gearbox housing by means of at least one first planetary carrier radial sliding bearing and by means of at least one first planetary carrier axial sliding bearing, wherein the first planetary carrier radial sliding bearing and/or the first planetary carrier axial sliding bearing is simultaneously formed as a flow connection element for flow connection of the oil distribution channel section of the first planet carrier cheek to a first lubricating oil supply bore arranged in the planetary gearbox housing. The effect of the flow connection element may be achieved by a circumferential oil distribution groove, which is formed in the region of the sliding surface of the planetary carrier radial sliding bearing or the planetary carrier axial sliding bearing, in particular on the sliding surface itself, or on the surface cooperation with the sliding surface.

The planetary gearbox according to the invention entails the advantage that the first planetary carrier radial sliding bearing may simultaneously act as an oil distribution ring, whereby a design of the planetary gearbox may be achieved that is as simple as possible. Thereby, the quality of the oil feed to the individual sliding surfaces may be improved, whereby the lifespan of the planetary gearbox may surprisingly be increased. The combination of a first planetary carrier radial sliding bearing with a first planetary carrier axial sliding bearing, wherein the first planetary carrier radial sliding bearing and/or the first planetary carrier axial sliding bearing is simultaneously formed as a flow connection element for flow connection of the oil distribution channel section of the first planet carrier cheek to a first lubricating oil supply bore arranged in the planetary gearbox housing, entails the surprising advantage that an improved oil transport may be achieved as compared to a design without a planetary carrier axial sliding bearing. In tests, it became apparent that the use of a rolling bearing for axial bearing results in worse oil transport than in the design according to the invention. The reason for this surprising effect is not yet clear. Particularly in the design in which the first planetary carrier radial sliding bearing and the first planetary carrier axial sliding bearing are formed as the flow connection element, a sufficient volume flow of lubricant oil may be provided.

The planetary gear radial sliding bearing may, for example, be designed in the form of a separate sliding bearing bush, which is arranged between the planetary gear and the planetary gear bolt. In this regard, the planetary gear radial sliding bearing may either be pressed into the planetary gear or be pressed onto the planetary gear bolt.

In a further embodiment variant, it may also be provided that the planetary gear radial sliding bearing is applied directly to the planetary gear bolt by means of a materially-bonded connection or is incorporated directly in the planetary gear.

Moreover, it may be useful if a circumferential oil distribution groove is formed in the region of the first planetary carrier radial sliding bearing. By means of the circumferential oil distribution groove, a flow connection between the first lubricating oil supply bore and the sliding surfaces to be supplied with lubricating oil may be established in each rotational angle position of the planetary carrier relative to the planetary gearbox housing.

Furthermore, it may be provided that the first planetary carrier radial sliding bearing is accommodated in the planetary gearbox housing so as to be fixed in position and a sliding surface is formed on an inner jacket surface of the planetary carrier radial sliding bearing. Particularly in such a design of the planetary carrier radial sliding bearing, the lubricating oil may well be directed from the stationary into the rotating component.

In addition to this, it may be provided that the circumferential oil distribution groove is arranged on the inner jacket surface of the planetary carrier radial sliding bearing.

A design according to which it may be provided that the circumferential oil distribution groove is formed on a first bearing section of the first planet carrier cheek is also advantageous.

According to an advancement, it is possible that the oil distribution channel section of the first planet carrier cheek opens into the circumferential oil distribution groove.

Furthermore, it may be useful if the first planetary carrier radial sliding bearing is accommodated on the first bearing section of the first planet carrier cheek and the sliding surface is formed on an outer jacket surface of the planetary carrier radial sliding bearing.

In addition to this, it may be provided that the circumferential oil distribution groove is arranged on the outer jacket surface of the planetary carrier radial sliding bearing.

Moreover, it may be provided that a first sun gear radial sliding bearing is formed, which serves for bearing of a shaft on which the sun gear is arranged, wherein the first sun gear radial sliding bearing comprises a sliding surface which is fluidically connected at least in some sections to the oil distribution channel section of the first planet carrier cheek. By this measure, it may be achieved that also the sun gear radial sliding bearing may be supplied with lubricating oil.

According to a particular design, it is possible that at least one first axial sliding bearing is formed for bearing the planetary gear, wherein the first axial sliding bearing comprises a sliding surface which is fluidically connected at least in some sections to the oil distribution channel section of the first planet carrier cheek. This formation entails the advantage that the axial sliding bearing of the planetary gear may also be supplied with lubricating oil.

In a further alternative, it may be provided that the first planetary carrier radial sliding bearing and the first planetary carrier axial sliding bearing are combined in a collar bearing. Particularly such a collar bearing may surprisingly well be used as a flow connection element.

Moreover, a wind turbine having a rotor; a nacelle; a generator arranged in the nacelle; and a planetary gearbox for transmitting and translating a torque from the rotor to the generator is provided. The planetary gearbox is formed according to the above statements.

The individual oil distribution channel sections may be produced in the form of individual bores and may form a fluidically connected system of individual oil distribution channel sections. So as to be able to provide a closed system of oil distribution channel sections, which are designed such that the lubricating oil is transported to those locations where it is required, it may be necessary that outwardly extending openings of the oil distribution channel sections, which are necessary for manufacturing reasons, are closed by means of a closure. Such a closure may for example be a grub screw, which is screwed into a corresponding opening using an adhesive sealant, whereby said opening is closed.

In the present document, lubricating oil is assumed to be the lubricant. However, it is a measure common to the person skilled in the art that another lubricant, for example grease, can also be transported in the present structure of the planetary gearbox and that the scope of protection is therefore not limited to the use of a particular lubricant.

For the purpose of better understanding of the invention, it will be elucidated in more detail by means of the figures below.

Figure 2:
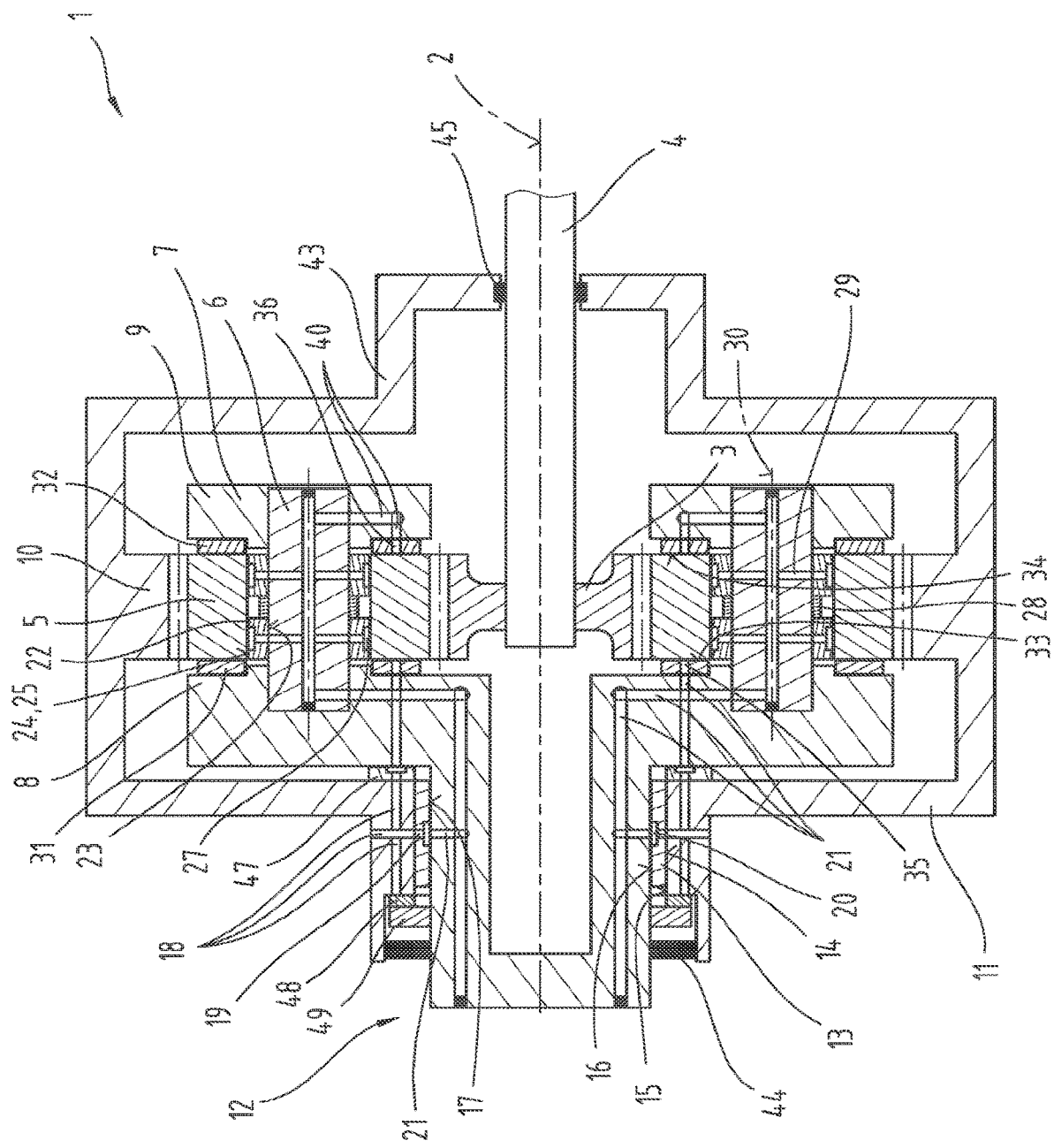

These show in a respectively very simplified schematic representation:

FIG. 1 a first exemplary embodiment of a planetary gearbox in a schematic sectional representation;

FIG. 2 a second exemplary embodiment of a planetary gearbox in a schematic sectional representation;

FIG. 3 a first embodiment detail of the bearing of detail view X of FIG. 1;

FIG. 4 a second embodiment detail of the bearing of detail view X of FIG. 1;

FIG. 5 a third embodiment detail of the bearing of detail view X of FIG. 1;

FIG. 6 a fourth embodiment detail of the bearing of detail view X of FIG. 1.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIG. 1 shows an exemplary embodiment of a planetary gearbox 1 in a sectional view according to a cross section along a centerline 2 of the planetary gearbox 1. For the purpose of clarity, merely one half of the planetary gearbox 1 is shown, wherein, however, it is clear to the person skilled in the art how a planetary gearbox in its general structure is designed. The view according to FIG. 1 is shown schematically and serves for general explanation of the structure of the planetary gearbox and for showing the components installed in a planetary gearbox.

As is known, wind turbines comprise a tower on the upper end of which a nacelle is arranged, in which the rotor with the rotor blades is mounted. This rotor is operatively connected to a generator, which is also located in the nacelle, via the planetary gearbox 1, wherein the low rotational frequency of the rotor is translated into a higher rotational frequency of the generator rotor via the planetary gearbox 1. Since such designs of wind turbines are part of the prior art, at this point, reference is made to the relevant literature in this regard.

The planetary gearbox 1 has a sun gear 3 connected in a motion-coupled manner to a shaft 4 leading to the generator rotor. The sun gear 3 is surrounded by multiple planetary gears 5, for example two, preferably three. Both the sun gear 3 and the planetary gears 5 have outer end toothings, which are engaged in a meshing arrangement, wherein these end toothings are schematically represented in FIG. 1.

The planetary gears 5 are each accommodated in a planetary carrier 7 by means of a planetary gear bolt 6. Moreover, it may be provided that the planetary gear bolt 6 is fixed and/or accommodated in a first planet carrier cheek 8 and a second planet carrier cheek 9 in a force-fitted or positively locked manner. In particular, it may be provided that the planetary gear bolt 6 is secured against rotation via any not explicitly shown securing element. The two planet carrier cheeks 8, 9 are parts of the planetary carrier 7.

An internal gear 10 is arranged to surround the planetary gears 5, which internal gear has an internal toothing which is engaged in a meshing arrangement with the end toothing of the planetary gears 5. The internal gear 10 may be formed in a single-part or multi-part planetary gearbox housing 11, and/or coupled thereto.

Moreover, it may be provided that at least the first planet carrier cheek 8 is coupled to a rotor connection 12, wherein the rotor connection 12 serves for torque transmission between the rotor hub of the wind turbine and the planetary carrier 7.

Moreover, it may be provided that in the planetary gearbox housing 11 at least one first planetary carrier radial sliding bearing 13 is arranged, which serves for bearing the planetary carrier 7 in the planetary gearbox housing 11.

In a first embodiment variant, which is shown in FIG. 1, the first planetary carrier radial sliding bearing 13 may be firmly accommodated on its outer jacket surface 14 in a first bearing section 15 of the planetary gearbox housing 11, wherein a sliding surface 17 may be formed on an inner jacket surface 16 of the first planetary carrier radial sliding bearing 13.

Moreover, it may be provided that a first lubricating oil supply bore 18, which is coupled to a lubricating oil supply device, such as a pump, and which is guided to the first planetary carrier radial sliding bearing 13, is arranged in the first bearing section 15 of the planetary gearbox housing 11. Moreover, a lubricating oil supply bore 19, which is fluidically connected to the first lubricating oil supply bore 18, may be arranged in the first planetary carrier radial sliding bearing 13. Moreover, an oil distribution groove 20, by means of which the lubricating oil may be guided from the fixed first planetary carrier radial sliding bearing 13 into an oil distribution channel section 21 of the first planet carrier cheek 8 of the planetary carrier 7 rotating about the centerline 2, may be formed on the inner jacket surface 16 of the first planetary carrier radial sliding bearing 13. The oil distribution groove 20 may be a circumferential groove. Of course, it may alternatively also be provided that the oil distribution groove is formed in the bearing region in the first planet carrier cheek 8 of the planetary carrier 7 and is fluidically connected to the lubricating oil bore 19 of the first planetary carrier radial sliding bearing 13.

In other words, the first planetary carrier radial sliding bearing 13 may simultaneously act as an oil distribution ring, by means of which the lubricating oil may be guided from the first lubricating oil supply bore 18 of the fixed planetary gearbox housing 11 to the oil distribution channel section 21 of the first planet carrier cheek 8, which rotates relative to the planetary gearbox housing 11. The sliding surface 17 of the first planetary carrier radial sliding bearing 13 may thus be supplied with lubricating oil, wherein the first planetary carrier radial sliding bearing 13 simultaneously serves for transmitting the lubricating oil from the planetary gearbox housing 11 to the first planet carrier cheek 8.

Moreover, it may be provided that for bearing the planetary gears 5, at least one planetary gear radial sliding bearing 22 is provided on the planetary gear bolts 6 of each planetary gear 5. According to a first embodiment variant, the planetary gear radial sliding bearing 22 is mounted on an inner jacket surface 23 on the planetary gear bolt 6. A sliding surface 25 is formed on an outer jacket surface 24 of the planetary gear radial sliding bearing 22. Moreover, it may be provided that in the planetary gear radial sliding bearing 22, a lubricating oil bore 26 is formed which is guided from the inner jacket surface 23 of the planetary gear radial sliding bearing 22 to the outer jacket surface 24 of the planetary gear radial sliding bearing 22.

Moreover, it may be provided that at least one lubricating oil collection bag 27, which is fluidically coupled to the lubricating oil bore 26 in the planetary gear radial sliding bearing 22, is formed on the outer jacket surface 24 of the planetary gear radial sliding bearing 22. In particular, it may be provided that two lubricating oil bores 26 and two lubricating oil collection bags 27 are formed on the planetary gear radial sliding bearing 22 so as to diametrically oppose one another.

As can be seen from FIG. 1, it may be provided that two planetary gear radial sliding bearings 22 per planetary gear 5 are provided, wherein the planetary gear radial sliding bearings 22 are arranged so as to be spaced apart from one another. In this regard, it may particularly be provided that a distance sleeve 28 is arranged between the two planetary gear radial sliding bearings 22.

As can also be seen from FIG. 1, it may be provided that oil distribution channel sections 29, which open into the lubricating oil bores 26 of the planetary gear radial sliding bearing 22, are formed in the planetary gear bolt 6. The oil distribution channel sections 29 may comprise axially extending partial sections which are arranged in parallel to a centerline 30 of the planetary gear bolt 6. These axially extending partial sections may open into one or multiple radially extending partial sections, which are guided to the outer jacket surface of the planetary gear bolt 6.

Moreover, it is provided that the oil distribution channel sections 21 of the first planet carrier cheek 8 are fluidically connected to the oil distribution channel sections 29 of the planetary gear bolt 6. Hence, it may be achieved that the sliding surface 25 of the planetary gear radial sliding bearing 22 may be supplied with lubricating oil via the first lubricating oil supply bore 18.

In an alternative embodiment variant, which is not shown, it may be provided that the planetary gear radial sliding bearing 22 is fixedly accommodated in the planetary gear 5 by means of its outer jacket surface 24 and the sliding surface 25 of the planetary gear radial sliding bearings 22 is formed on its inner jacket surface 23, which cooperates with the planetary gear bolt 6. In this regard, it may be provided that a lubricating oil collection bag for supplying the sliding surface 25 with lubricating oil is formed directly in the planetary gear bolt 6.

Moreover, a first axial sliding bearing 31 and a second axial sliding bearing 32 may be arranged in each case at the front side of a planetary gear 5. In particular, it may be provided that the first axial sliding bearing 31 is arranged between the planetary gear 5 and the first planet carrier cheek 8. Analogously thereto, it may be provided that the second axial sliding bearing 32 is arranged between the planetary gear 5 and the second planet carrier cheek 9.

In particular, it may be provided that the axial sliding bearings 31, 32 are each fixedly accommodated on the planet carrier cheeks 8, 9. In this regard, a sliding surface 33, on which a first end face of the planetary gear 5 abuts, may be formed on the first axial sliding bearing 31. Moreover, a sliding surface 34, on which a second end face of the planetary gear 5 abuts, may be formed on the second axial sliding bearing 32. The planetary gear 5 may thus be rotated relative to the axial sliding bearings 31, 32.

Moreover, it may be provided that a lubricating oil bore 35 is provided in the first axial sliding bearing 31. Analogously to this, it may also be provided that a lubricating oil bore 36 is provided in the second axial sliding bearing 32. By means of the lubricating oil bores 35, 36, lubricating oil may be guided to the sliding surfaces 33, 34.

In particular, it may be provided that the lubricating oil bore 35 of the first axial sliding bearing 31 is fluidically connected to an oil distribution channel section 21 of the first planet carrier cheek 21.

In a further embodiment variant, which is not depicted, it may be provided that the axial sliding bearings 31, 32 are mounted on the planetary gear 5. In this regard, the sliding surfaces 33, 34 of the axial sliding bearings 31, 32 face the planet carrier cheeks 8, 9 and slide on these.

As can further be seen from FIG. 1, it may be provided that a first sun gear radial sliding bearing 37 is formed which serves for bearing the shaft 4 on which the sun gear 3 is mounted. In particular, it may be provided that the first sun gear radial sliding bearing 37 is arranged between a cavity of the first planet carrier cheek 8 and the shaft 4. The first sun gear radial sliding bearing 37 may also have a sliding surface 38, which is formed on an outer jacket surface of the first sun gear radial sliding bearing 37 in the exemplary embodiment shown in FIG. 1. Thus, the sun gear radial sliding bearing 37 is arranged fixedly on the shaft 4 in the shown exemplary embodiment.

Alternatively, it may of course also be provided that the sliding surface 38 is formed on an inner jacket surface of the first sun gear radial sliding bearing 37. If the sliding surface 38 of the first sun gear radial sliding bearing 37 is formed on the inner jacket surface of the first sun gear radial sliding bearing 37, a lubricating oil bore, which serves for supplying the sliding surface 38 of the first sun gear radial sliding bearing 37 with lubricating oil, may also be formed in the first sun gear radial sliding bearing 37 analogously to the planetary gear radial sliding bearing 22.

Moreover, it may be provided that the sliding surface 38 of the first sun gear radial sliding bearing 37 is also fluidically connected to an oil distribution channel section 21 of the first planet carrier cheek 8.

As can further be seen from FIG. 1, it may be provided that a lubricating oil collection bag 39 is formed in the cavity of the first planet carrier cheek 8, in which the sun gear radial sliding bearing 37 is accommodated.

As can further be seen from FIG. 1, it may be provided that an oil distribution channel section 40, which serves for supplying the planetary gear radial sliding bearing 22 with oil, is formed also in the second planet carrier cheek 9.

Moreover, it may be provided that the oil distribution channel section 40 serves for supplying the second axial sliding bearing 32 with oil.

Moreover, it may be provided that the oil distribution channel section 40 serves for supplying the second sun gear radial sliding bearing 41 with oil. In this regard, the second sun gear radial sliding bearing 41 may be arranged between the shaft 4 and the second planet carrier cheek 9 analogously to the first sun gear radial sliding bearing 37.

Moreover, it may be provided that a second planetary carrier radial sliding bearing 42 is formed, which serves for bearing the second planet carrier cheek 9 in the planetary gearbox housing 11. The second planetary carrier radial sliding bearing 42 may be formed analogously to the first planetary carrier radial bearing 13 and may also act as an oil distribution ring, by means of which the oil distribution channel section 40 of the second planet carrier cheek 9 is fluidically coupled to a second lubricating oil supply bore 43 of the planetary gearbox housing 11.

As can further be seen from FIG. 1, a first seal 44 may be formed, which serves for sealing the planetary gearbox housing 11 against the first planet carrier cheek 8.

Moreover, a second seal 45 may be formed, which serves for sealing the planetary gearbox housing 11 against the second planet carrier cheek 9. The seals 44, 45, may be formed as commonly known to the person skilled in the art.

As can further be seen from FIG. 1, it may be provided that a first planetary carrier axial sliding bearing 47, which serves for axial bearing of the planetary carrier 7 in a first axial direction, is arranged in the region of the first planet carrier cheek 8. Moreover, it may be provided that a second planetary carrier axial sliding bearing 48, which serves for axial bearing of the planetary carrier 7 in a second axial direction, is arranged in the region of the second planet carrier cheek 9.

Moreover, it may be provided that an oil distribution channel section 21, which is guided to the first planetary carrier axial sliding bearing 47, is formed in the first planet carrier cheek 8. Moreover, it may be provided that the first lubricating oil supply bore 18 in the planetary gearbox housing 11 is guided to the first planetary carrier axial sliding bearing 47.

FIG. 2 shows a further and possibly independent embodiment of the planetary gearbox 1, wherein again, equal reference numbers/component designations are used for equal parts as before in FIG. 1. In order to avoid unnecessary repetitions, it is pointed to/reference is made to the detailed description in FIG. 1 preceding it.

As can be seen from FIG. 2, in an alternative embodiment variant, it may be provided that the second planet carrier cheek 9 is not mounted but merely supported by the connection with the first planet carrier cheek 8. In such a design, the oil distribution channel section 40 of the second planet carrier cheek 9, which serves for supplying the second axial sliding bearing 32 of the planetary gear 5 with lubricating oil, may nevertheless be provided.

Since no second lubricating oil supply bore 43 is provided in the present exemplary embodiment according to FIG. 2, the oil distribution channel section 40 of the second planet carrier cheek 9 is fluidically coupled to the oil distribution channel section 21 of the first planet carrier cheek 8. This flow connection may be established via the oil distribution channel section 29 of the planetary gear bolt 6.

As can further be seen from the exemplary embodiment according to FIG. 2, it may be provided that the shaft 4, on which the sun gear 3 is arranged, is not mounted within the planetary gearbox 1.

As can further be seen from FIG. 2, it may be provided that both the first planetary carrier axial sliding bearing 47 and the second planetary carrier axial sliding bearing 48 are formed in the region of the first planet carrier cheek 8. In such an embodiment variant, it may be provided that a securing element 49, which cooperates with the second planetary carrier axial sliding bearing 48, is formed on an outer circumference of the first planet carrier cheek 8 in the region of the rotor connection 12. The securing element 49 may, for example, take the form of a shaft nut, which can be screwed onto the outer circumference of the first planet carrier cheek 8 in the region of the rotor connection 12.

FIG. 3 shows a detail view of the bearing details of the first planetary carrier radial sliding bearing 13. As can be seen from FIG. 3, it may be provided that the outer jacket surface 14 of the planetary carrier radial sliding bearing 13 abuts in the first bearing section 15 of the planetary gearbox housing 11 and is stationarily accommodated thereon. In this regard, the planetary carrier radial sliding bearing 13 may be accommodated in the first bearing section 15 of the planetary gearbox housing 11 by means of a press fit. Moreover, non-depicted fastening means may be provided for fixation of the planetary carrier radial sliding bearing 13. Moreover, it may be provided that the lubricating oil bore 19 of the first planetary carrier radial sliding bearing 13 is arranged so as to be aligned with the first lubricating oil supply bore 18. The sliding surface 17, which cooperates with a first bearing section 46 of the first planet carrier cheek 8 and/or slides relative thereto in operation, is formed on the inner jacket surface 16 of the first planetary carrier radial sliding bearing 13. Moreover, the circumferential oil distribution groove 20 is formed on the inner jacket surface 16 of the first planetary carrier radial sliding bearing 13. By the circumferential oil distribution groove 20, a flow connection between the lubricating oil bore 19 of the first planetary carrier radial sliding bearing 13 and the oil distribution channel section 21 of the first planet carrier cheek 8 may be achieved in each angular position of the first planet carrier cheek 8 during rotation of the first planet carrier cheek 8 about the centerline 2 of the planetary gearbox 1. As can further be seen from FIG. 3, it may be provided that the first planetary carrier axial sliding bearing 47 is fixed on the planetary gearbox housing 11.

FIG. 4 shows a further and possibly independent embodiment of the planetary gearbox 1, in particular the bearing detail from FIG. 3, wherein again, equal reference numbers/component designations are used for equal parts as before in FIG. 3. In order to avoid unnecessary repetitions, it is pointed to/reference is made to the detailed description in FIG. 3 preceding it.

As opposed to the exemplary embodiment of FIG. 3, in the exemplary embodiment of FIG. 4 the circumferential oil distribution groove 20 is formed on the first bearing section 46 of the first planet carrier cheek 8.

As can further be seen from FIG. 4, it may be provided that the first planetary carrier axial sliding bearing 47 comprises a lubricating oil bore 50. Moreover, it may be provided that the first planetary carrier axial sliding bearing 47 comprises a circumferential oil distribution groove 51. In particular, it may be provided that the lubricating oil bore 50 opens into the circumferential oil distribution groove 51.

FIG. 5 shows a further and possibly independent embodiment of the planetary gearbox 1, in particular the bearing detail from FIG. 3, wherein again, equal reference numbers/component designations are used for equal parts as before in FIG. 3. In order to avoid unnecessary repetitions, it is pointed to/reference is made to the detailed description in FIG. 3 preceding it.

As can be seen from FIG. 5, it may be provided that the inner jacket surface 16 of the planetary carrier radial sliding bearing 13 abuts on the first bearing section 46 of the first planet carrier cheek 8 and is stationarily accommodated thereon. In this regard, the planetary carrier radial sliding bearing 13 may be accommodated on the first bearing section 46 of the first planet carrier cheek 8 by means of a press fit. Moreover, non-depicted fastening means may be provided for fixation of the planetary carrier radial sliding bearing 13. Moreover, it may be provided that the lubricating oil bore 19 of the first planetary carrier radial sliding bearing 13 is arranged so as to be aligned with the oil distribution channel section 21 of the first planet carrier cheek 8. The sliding surface 17, which cooperates with the first bearing section 15 of the planetary gearbox housing 11 and/or slides relative thereto in operation, is formed on the outer jacket surface jacket surface 14 of the first planetary carrier radial sliding bearing 13. Moreover, the circumferential oil distribution groove 20 is formed on the outer jacket surface 14 of the first planetary carrier radial sliding bearing 13. By the circumferential oil distribution groove 20, a flow connection between the lubricating oil bore 19 of the first planetary carrier radial sliding bearing 13 and the first lubricating oil supply bore 18 may be achieved in each angular position of the first planet carrier cheek 8 during rotation of the first planet carrier cheek 8, along with the first planetary carrier radial sliding bearing 13, about the centerline 2 of the planetary gearbox 1.

As can further be seen from FIG. 5, it may be provided that the first planetary carrier radial sliding bearing 13 and the first planetary carrier axial sliding bearing 47 are combined in a collar bearing 52. In the present exemplary embodiment, the collar bearing 52 is fixed on the first planet carrier cheek 8. Of course, it may also be provided that the collar bearing 52 is fixed on the planetary gearbox housing 11.

FIG. 6 shows a further and possibly independent embodiment of the planetary gearbox 1, in particular the bearing detail from FIG. 5, wherein again, equal reference numbers/component designations are used for equal parts as before in FIG. 5. In order to avoid unnecessary repetitions, it is pointed to/reference is made to the detailed description in FIG. 5 preceding it.

As opposed to the exemplary embodiment of FIG. 5, in the exemplary embodiment of FIG. 6 the circumferential oil distribution groove 20 is formed in the first bearing section 15 of the planetary gearbox housing 11.

As can further be seen from FIG. 6, it may be provided that the first planetary carrier axial sliding bearing 47 is fixed on the planet carrier cheek 8.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS 1 planetary gearbox
2 centerline of planetary gearbox
3 sun gear
4 shaft
5 planetary gear
6 planetary gear bolt
7 planetary carrier
8 first planet carrier cheek
9 second planet carrier cheek
10 internal gear
11 planetary gearbox housing
12 rotor connection
13 first planetary carrier radial sliding bearing
14 outer jacket surface of the first planetary carrier radial sliding bearing
15 first bearing section of the planetary gearbox housing
16 inner jacket surface of the first planetary carrier radial sliding bearing
17 sliding surface of the first planetary carrier radial sliding bearing
18 first lubricating oil supply bore
19 lubricating oil bore of the first planetary carrier radial sliding bearing
20 oil distribution groove of the first planetary carrier radial sliding bearing
21 oil distribution channel section of the first planet carrier cheek
22 planetary gear radial sliding bearing
23 inner jacket surface of the planetary gear radial sliding bearing
24 outer jacket surface of the planetary gear radial sliding bearing
25 sliding surface of the planetary gear radial sliding bearing
26 lubricating oil bore of the planetary gear radial sliding bearing
27 lubricating oil collection bag
28 distance sleeve
29 oil distribution channel section of the planetary gear bolt
30 centerline of the planetary gear bolt
31 first axial sliding bearing of the planetary gear
32 second axial sliding bearing of the planetary gear
33 sliding surface of the first axial sliding bearing
34 sliding surface of the second axial sliding bearing
35 lubricating oil bore of the first axial sliding bearing
36 lubricating oil bore of the second axial sliding bearing
37 first sun gear radial sliding bearing
38 sliding surface of the first sun gear radial sliding bearing
39 lubricating oil collection bag
40 oil distribution channel section of the second planet carrier cheek
41 second sun gear radial sliding bearing
42 second planetary carrier radial sliding bearing
43 second lubricating oil supply bore
44 first seal -continued 45 second seal
46 first bearing section of the first planet carrier cheek
47 first planetary carrier axial sliding bearing
48 second planetary carrier axial sliding bearing
49 securing element
50 lubricating oil bore of the first planetary carrier axial sliding bearing
51 oil distribution groove of the first planetary carrier axial sliding bearing
52 collar bearing

The invention claimed is:

1. A planetary gearbox for a wind turbine, the planetary gearbox comprising:
    a planetary gearbox housing;
    at least one sun gear;
    at least one internal gear;
    a planetary carrier having a first planet carrier cheek and a second planet carrier cheek;
    at least one planetary gear bolt, which is accommodated in the planetary carrier;
    at least one planetary gear, which is mounted on the planetary gear bolt;
    at least one planetary gear radial sliding bearing which serves for bearing the planetary gear on the planetary gear bolt and which comprises a sliding surface,
    wherein an oil distribution channel section, which is fluidically connected to at least one section of the sliding surface, is formed at least in the first planet carrier cheek,
    wherein the first planet carrier cheek of the planetary carrier is mounted in the planetary gearbox housing by means of at least one first planetary carrier radial sliding bearing and by means of at least one first planetary carrier axial sliding bearing,
    wherein the at least one first planetary carrier radial sliding bearing and/or the at least one first planetary carrier axial sliding bearing is formed as a flow connection element for flow connection of the oil distribution channel section of the first planet carrier cheek to a first lubricating oil supply bore arranged in the planetary gearbox housing,
    wherein a first sun gear radial sliding bearing is formed, which serves for bearing of a shaft on which the sun gear is arranged, and
    wherein the first sun gear radial sliding bearing comprises a sliding surface which is fluidically connected at least in some sections to the oil distribution channel section of the first planet carrier cheek.

2. The planetary gearbox according to claim 1, wherein the at least one first planetary carrier radial sliding bearing is accommodated on a first bearing section of the first planet carrier cheek and a sliding surface is formed on an outer jacket surface of the at least one first planetary carrier radial sliding bearing.

3. The planetary gearbox according to claim 1, wherein at least one first axial sliding bearing is formed for bearing the planetary gear, wherein the at least one first axial sliding bearing comprises a sliding surface which is fluidically connected at least in some sections to the oil distribution channel section of the first planet carrier cheek.

4. The planetary gearbox according to claim 1, wherein the at least one first planetary carrier radial sliding bearing and the at least one first planetary carrier axial sliding bearing are combined in a collar bearing.

5. The planetary gearbox according to claim 1, wherein a circumferential oil distribution groove is formed in the region of the at least one first planetary carrier radial sliding bearing.

6. The planetary gearbox according to claim 5, wherein the oil distribution channel section of the first planet carrier cheek opens into the circumferential oil distribution groove.

7. The planetary gearbox according to claim 5, wherein the at least one first planetary carrier radial sliding bearing is accommodated in the planetary gearbox housing so as to be fixed in position and a sliding surface is formed on an inner jacket surface of the at least one first planetary carrier radial sliding bearing.

8. The planetary gearbox according to claim 7, wherein the circumferential oil distribution groove is arranged on the inner jacket surface of the at least one first planetary carrier radial sliding bearing.

9. The planetary gearbox according to claim 7, wherein the circumferential oil distribution groove is formed on a first bearing section of the first planet carrier cheek.

10. A planetary gearbox for a wind turbine, the planetary gearbox comprising:
    a planetary gearbox housing;
    at least one sun gear;
    at least one internal gear;
    a planetary carrier having a first planet carrier cheek and a second planet carrier cheek;
    at least one planetary gear bolt, which is accommodated in the planetary carrier;
    at least one planetary gear, which is mounted on the planetary gear bolt;
    at least one planetary gear radial sliding bearing which serves for bearing the planetary gear on the planetary gear bolt and which comprises a sliding surface,
    wherein an oil distribution channel section, which is fluidically connected to at least one section of the sliding surface, is formed at least in the first planet carrier cheek,
    wherein the first planet carrier cheek of the planetary carrier is mounted in the planetary gearbox housing by means of at least one first planetary carrier radial sliding bearing and by means of at least one first planetary carrier axial sliding bearing,
    wherein the at least one first planetary carrier radial sliding bearing and/or the at least one first planetary carrier axial sliding bearing is formed as a flow connection element for flow connection of the oil distribution channel section of the first planet carrier cheek to a first lubricating oil supply bore arranged in the planetary gearbox housing, and
    wherein the at least one first planetary carrier radial sliding bearing and the at least one first planetary carrier axial sliding bearing are combined in a collar bearing.

11. A planetary gearbox for a wind turbine, the planetary gearbox comprising:
    a planetary gearbox housing;
    at least one sun gear;
    at least one internal gear;
    a planetary carrier having a first planet carrier cheek and a second planet carrier cheek;
    at least one planetary gear bolt, which is accommodated in the planetary carrier;
    at least one planetary gear, which is mounted on the planetary gear bolt;

at least one planetary gear radial sliding bearing which serves for bearing the planetary gear on the planetary gear bolt and which comprises a sliding surface, wherein an oil distribution channel section, which is fluidically connected to at least one section of the sliding surface, is formed at least in the first planet carrier cheek, wherein the first planet carrier cheek of the planetary carrier is mounted in the planetary gearbox housing by means of at least one first planetary carrier radial sliding bearing and by means of at least one first planetary carrier axial sliding bearing, wherein the at least one first planetary carrier radial sliding bearing and/or the at least one first planetary carrier axial sliding bearing is formed as a flow connection element for flow connection of the oil distribution channel section of the first planet carrier cheek to a first lubricating oil supply bore arranged in the planetary gearbox housing, and wherein the first planetary carrier axial sliding bearing comprises a lubricating oil bore which is fluidically connected to the oil distribution channel section of the first planet carrier cheek.

\* \* \* \* \*